United States Patent

Milani et al.

[11] Patent Number: 6,127,305
[45] Date of Patent: *Oct. 3, 2000

[54] CATALYST AND PROCESS FOR POLYMERIZING ALPHA-OLEFINS

[75] Inventors: Federico Milani, Santa Maria Maddalena; Luciano Luciani; Bruno Pivotto, both of Ferrara; Antonio Labianco, Stienta, all of Italy

[73] Assignee: Enichem S.p.A, Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/725,696

[22] Filed: Oct. 3, 1996

Related U.S. Application Data

[63] Continuation of application No. 08/107,302, Aug. 17, 1993, abandoned.

[30] Foreign Application Priority Data

Sep. 15, 1992 [IT] Italy ................. MI92A02125

[51] Int. Cl.[7] ....................................... B01J 27/10
[52] U.S. Cl. .................. 502/131; 502/103; 502/104; 502/107; 502/117; 502/119; 526/122; 526/127; 526/160
[58] Field of Search ..................... 502/103, 104, 502/107, 117, 119, 131; 526/122, 127, 160

[56] References Cited

U.S. PATENT DOCUMENTS

| | | | |
|---|---|---|---|
| 4,330,646 | 5/1982 | Sakurai et al. | 526/127 |
| 4,471,066 | 9/1984 | Sakurai et al. | 502/113 |
| 4,808,561 | 2/1989 | Welborn, Jr. | 502/104 |
| 5,142,005 | 8/1992 | Albizzati, Jr. | 526/125 |
| 5,270,275 | 12/1993 | Luciani et al. | 502/116 |
| 5,329,031 | 7/1994 | Miyake et al. | 556/12 |

FOREIGN PATENT DOCUMENTS

| | | |
|---|---|---|
| 0 283 958 | 9/1988 | European Pat. Off. . |
| 0 439 964 | 8/1991 | European Pat. Off. . |
| 0 500 944 | 9/1992 | European Pat. Off. . |
| 480434 | 4/1992 | France ................. 526/127 |
| 64-6004 | 1/1989 | Japan .................. 526/160 |
| 1464909 | 2/1977 | United Kingdom ............ 526/124.7 |

OTHER PUBLICATIONS

"Synthesis and Applications of Chiral Cyclopentadienyl-metal Complexes," Ronald L. Halterman, CHEM. REV. 92, pp. 965–994, Aug. 1992.

PTO 94–5019, PTO Translation of JP 64–6004, pp. 1–30, Sep. 1994.

Database WPI, Derwent Publications, AN 89–050143, JP–A–1 006 005, Jan. 10, 1989.

*Primary Examiner*—David W. Wu
*Assistant Examiner*—Ling-Siu Choi
*Attorney, Agent, or Firm*—Oblon, Spivak, McClelland, Maier & Neustadt, P.C.

[57] ABSTRACT

An active catalyst in the polymerization of alpha-olefins is obtained by:

(i) bringing a dialkyl magnesium, or an alkyl magnesium halide into contact with a silicon or tin halide, in solution in an inert organic solvent, until a granular solid precipitates off;

(ii) suspending said solid precipitate in an inert organic solvent and bringing it into contact with a compound which can be defined by the formula:

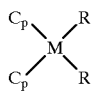

wherein M represents a metal from Group IVB of the Periodic Table of Elements, and each R and $C_p$ has the meaning as reported in the disclosure, in order to form a granular solid catalyst; and (iii) recovering said solid catalyst from the resulting suspension.

14 Claims, No Drawings

CATALYST AND PROCESS FOR POLYMERIZING ALPHA-OLEFINS

This application is a Continuation of application Ser. No. 08/107,302, filed on Aug. 17, 1993, now abandoned.

The present invention relates to a process for producing a catalyst for the polymerization of alpha-olefins, to the so obtained catalyst and to its use in alpha-olefin polymerization processes.

In the art, it is generally known that ethylene, or, in general, alpha-olefins can be polymerized by means of the low-pressure process, by using Ziegler-Natta catalysts. The useful catalysts for that purpose are generally formed by a compound of a transition metal (elements from the Groups IV–VIII of the Periodic Table of Elements), in mixture with an organometallic compound or hydride of the elements from Groups I–III of the Periodic Table, by operating in suspension, in solution, or in the absence of solvent or diluents. For further information on this known technique, reference is made to the description by J. Boor, in "Ziegler-Natta Catalysts and Polymerization", Academic Press, New York (1979).

A particular class of active catalysts in the polymerization of olefins is constituted by the combination of an aluminoxane with a cyclopentadienylic derivative of such metals as titanium, zirconium or hafnium (Group IVB), also referred to as "metallocenes", as described, for example, by H. Sinn, W. Kaminsky, in Adv. Organomet. Chem. 18, 99 (1980) and in U.S. Pat. No. 4,542,199. These catalysts display a high catalytic activity, and capability to produce polymers with desired characteristics as a function of the particular catalytic composition used and of the olefin, or olefin mixture, submitted to polymerization. For such a prior art, reference is made to the disclosure of U.S. Pat. Nos. 4,530,914; 4,935,474; 4,937,299 and 5,001,205; and of European patent applications with publication Nos. 318,049; 384,171 and 387,609.

In the art also the need has been felt for long, for being able to deposit the metallocene species on a solid carrier material, in order to have available supported catalysts, useful for controlling the morphological characteristics of the polymers. However it was observed in practice that supporting metallocenes onto such materials as silica, alumina and magnesium chloride does not make it possible the desired purposes to be fully achieved both owing to the difficulties met when one tries to support metallocenes, and on considering the decreased catalytic activity displayed by the so supported metallocenes.

Also known in the art is preparing catalysts of Ziegler-Natta type by causing a titanium compound, in particular an alkyl titanate, to react with the solid products from the reaction between an alkyl magnesium and a halogenating agent, such as disclosed, e.g., in European patent applications published with publication Nos. 204,340 and 209,104.

The present invention is essentially based on the finding that the solid products from the reaction between a dialkyl magnesium or an alkyl magnesium halide with particular halogenating, silicon- or preferably tin-containing agents, constitute excellent carrier materials for supporting metallocenes, because they, on the one side, make it possible the typical polymerizing activity displayed by metallocenes to be retained unaltered and, on the other hand, catalysts to be obtained which are suitable for controlling the morphology of the olefinic polymers.

In accordance therewith, in a first aspect thereof, the present invention relates to a process for preparing a catalyst containing a cyclopentadienylic derivative of a metal from the Group IVB of the Periodic Table of Elements, supported on a solid carrier, by means of the following steps:

(i) in an inert organic solvent, a dialkyl magnesium, or an alkyl magnesium halide, and a silicon or tin halide are dissolved in an inert organic solvent, with the atomic ratio of silicon or tin, in said silicon or tin halides, to magnesium, in said dialkyl magnesium or alkyl magnesium halide, being comprised within the range of from 0.1:1 to 15:1, and said reactants are kept into mutual contact until from the solution a granular solid precipitates off;

(ii) said granular solid is suspended in an inert organic solvent and is brought into contact with a compound which can be defined by the formula:

wherein: M means a metal from the Group IVB of the Periodic Table of Elements; each R independently means a halogen atom, an either linear or branched alkyl group containing from 1 to 10 carbon atoms; or an aryl group; and each $C_p$ independently means a cyclopentadienyl, indenyl or fluorenyl group, possibly bearing one or more $C_1$–$C_4$ alkyl substituents, and said groups $C_p$ may be furthermore linked to each other by means of a bridge structure of carbon atoms or an alkyl silanic structure, with an atomic ratio of magnesium, added during said step (i), to said metal of Group IVB in the compound (I), comprised within the range of from 1:1 to 10,000:1, by operating at a temperature comprised within the range of from 0° C. to 100° C. and for a time period of at least 0.5 hours, in order to form a granular solid catalyst; and (iii) said solid catalyst is recovered from the resulting suspension which contains it.

Therefore, during the step (i) of the process, a granular solid is precipitated from a solution, in an inert organic solvent, of a dialkyl magnesium or alkyl magnesium halide and a silicon or tin halide.

The suitable dialkyl magnesium compounds for the intended purpose are those compounds which can be represented by the formula MgR'R"

wherein each R' and R", which may be the same, or different from each other, independently means a linear or branched alkyl group of from 1 to 10 carbon atoms.

Specific examples of dialkyl magnesium are: diethyl magnesium, ethyl butyl magnesium, dihexyl magnesium, butyl octyl magnesium and dioctyl magnesium. Also the corresponding alkyl magnesium halides, in particular chlorides, can be used.

The silicon halide can be selected from silicon chlorides and bromides and chloro- and bromo silanes and, in particular, from silicon tetrachloride, silicon tetrabromide, trichloro silane, vinyl trichloro silane, trichloro ethoxy silane and chloro ethyl trichloro silane. Silicon tetrachloride is preferably used.

The suitable tin halides for the intended purpose are tin chlorides and bromides, and preferably tin tetrachloride is used.

From all such halogenating agents as mentioned above, tin tetrachloride is most preferred.

The useful solvents in order to dissolve the above reported compounds are those organic solvents which are liquid under the operating conditions, and inert (non reactive) towards the other components. Examples of suitable solvents are hydrocarbons, in particular aliphatic hydrocarbons, such as, e.g., pentane, isopentane, hexane, heptane and octane.

When the step (i) is carried out in practice, the process can be performed by preparing a solution of dialkyl magnesium or alkyl magnesium halide, in the selected organic solvent. To the resulting solution silicon halide or tin halide is fed, by operating at a temperature comprised within the range of from about 0° C. up to room temperature (20–25° C.), until an atomic ratio of silicon or tin to magnesium of from 0.1:1 to 15:1 and preferably of from 0.5:1 to 10:1 is reached. The solution is then heated up to a temperature comprised within the range of from 30 to 70° C. and preferably of the order of 60–70° C., and is kept with stirring, until the precipitation of a granular solid is obtained. The required time amounts in order to obtain a complete, or substantially complete precipitation, are generally comprised within the range of from 0.5 to 5 hours, and typically are of the order of 1 hour.

At the end of this time period, the suspension is cooled, the solid is separated by means of the normal decantation, filtration or centrifugation techniques, the separated solid is washed with an inert organic solvent, such as an aliphatic hydrocarbon, and is optionally dried.

In the step (ii) of the process, the solid material from the above step is suspended in an inert organic solvent and is brought into contact with a compound of formula (I).

In particular, in said formula (I), the metal M is selected from titanium, zirconium and hafnium, with zirconium and hafnium being preferred. In said compound (I), each R preferably is a chlorine atom ar an alkyl group of from 1 to 8 carbon atoms, and each $C_p$ is preferably selected from cyclopentadienyl, indenyl and fluorenyl groups, which may either be non-substituted, or bear one or more $C_1$–$C_4$ alkyl substituents. When both moieties $C_p$ in compound (I) are linked with each other by means of a bridge linking structure, said bridge structure preferably consists of an either linear or branched alkylene group containing from 1 to 4 carbon atoms, or it is a dialkyl silyl radical, and preferably a dimethyl silyl radical. Examples of bridge-connected $C_p$ groups are ethylene bis(cyclopentadienyl), ethylene bis(indenyl), isopropyl (cyclopentadienyl-1-fluorenyl) and dimethyl silyl bis(cyclopentadienyl).

Specific examples of compounds (I) are consequently the following: bis(cyclopentadienyl) zirconium dichloride, bis(cyclopentadienyl) hafnium dichloride, bis(cyclopentadienyl) zirconium octyl chloride, bis(cyclopentadienyl) zirconium dimethyl, ethylene bis(indenyl) zirconium dichloride, ethylene bis(indenyl) hafnium dichloride and isopropyl (cyclopentadienyl filuorenyl) hafnium dichloride.

In the step (ii) of the process, of course a plurality of compounds (I) with different M's can be used, in particular in the preparation of useful catalysts in the manufacture of polyolefins with an extended distribution of molecular weight.

When the step (ii) is carried out in practice, the process can be performed by dissolving the compound (I) in an inert organic solvent which is advantageously selected from those used in step (i), and to the resulting solution the solid prepared as indicated above is suspended in such an amount as to ensure that a ratio of magnesium to the Group IVB metal will be obtained which is comprised within the range of from 1:1 to 10,000:1 and preferably of from 5:1 to 5000:1. The resulting suspension is kept heated at a temperature comprised within the range of from 0° to 100° C. for a time period of from 0.5 to 5 hours and preferably at a temperature comprised within the range of from 20 to 90° C., for a time period of from 1 to 2.5 hours.

At the end of this time period, the resulting suspension is cooled and the solid matter is separated, washed and dried, in a similar way as in above step (i).

In that way, a solid and granular catalyst is obtained which typically contains 10–40% by weight of magnesium, 5–70% by weight of chlorine, 0.05–5% by weight of silicon or tin and 0.001–20% by weight of a metal of Group IVB. Such a catalyst contains a carrier which normally is produced by reacting a dialkyl magnesium with a silicon or tin chloride. This carrier, when examined by X ray diffractometry, results to be constituted by magnesium chloride, which may be in either of its alpha or delta formes, as a function of the molar ratio of silicon or tin to magnesium which was used in the precipitation of the step (i) of the process.

Besides magnesium chloride, X ray analysis also shows that a solid compound with unknown structure is also present. It was observed that also the relative contents of magnesium chloride and said unknown compound in the carrier depend on the reactants ratio, as mentioned above.

An advantageous aspect of the present invention is that the (both morphological and compositional) characteristics of the carrier can be controlled in order to obtain suitable catalysts for the various use conditions in order to obtain polymers with desired characteristics, in the processes of olefin polymerization.

In the step (ii) of the process, a compound (I) is deposited onto the above disclosed carrier. In reality, it is not clear whether this is a physical adsorbtion, or whether a chemical interaction takes place, or whether both these phenomena occur. As a matter of fact, the eventually obtained catalyst displays a very high polymerizing activity for ethylene and alpha-olefin polymerization in general.

The present invention also relates to a catalytic system for alpha-olefin polymerization, which comprises the above disclosed solid catalyst and an aluminoxane co-catalyst.

As known, aluminoxanes are compounds which contain Al—O—Al linkages, with variable O/Al ratios, which can be obtained in the art by reacting, under controlled conditions, an alkyl aluminum or an alkyl aluminum halide, with water, and in the case of trimethyl aluminum, also with a salt hydrate, as aluminum sulfate hexahydrate, copper sulfate pentahydrate and iron sulfate pentahydrate. In particular, the catalytic systems according to the present invention are formed by said aluminoxane and the above disclosed catalyst in such proportions to each other that the atomic ratio of aluminum in the co-catalyst to the metal of Group IVB in the solid catalyst, is comprised within the range of from 10:1 to $10^8$:1 and preferably of from $10^2$:1 to $10^4$:1.

The catalytic systems according to the present invention are useful in ethylene polymerization to yield linear polyethylene and in the polymerization of propylene or higher alpha-olefins to yield atactic, syndiotactic or isotactic polymers, as a function of the particular catalytic composition selected and of specific polymerization conditions. The catalytic systems are furthermore active in copolymerization of ethylene with propylene and/or other olefins (production of LLDPE polymers) and in ethylene, propylene and diene terpolymerization.

The polymerization can be carried out by the suspension technique in an inert diluent, or in gas phase, with temperatures which are generally comprised within the range of from 20° C. to 120° C., at a pressure which is generally comprised within the range of from 1 to 300 bars, using a molecular weight control agent, for example hydrogen.

The following experimental examples are reported in order to illustrate the present invention in greater detail.

EXAMPLE 1

150 ml of a solution at 20% by weight of butyl octyl magnesium (MgBut$_{1.5}$Oct$_{0.5}$; 21.87 g, 131.3 mmol) in n-heptane, is charged under a nitrogen atmosphere to a flask of 500 ml equipped with reflux condenser, mechanical stirrer and thermometer.

150 ml of neat silicon tetrachloride (SiCl$_4$; 1.31 mol) is added dropwise to the solution, during a 1-hour time, at room temperature and with stirring. The temperature is then increased up to 65° C. and the reaction is allowed to proceed for 1 hour. The reaction is then cooled down to 40° C. and the liquid phase is removed by siphon. The recovered solid matter is thoroughly washed with n-hexane at room temperature and is dried by evaporating the solvent under vacuum. In that way, 13.1 g of a white solid with bulk density of approximately 0.11 g/ml is obtained, which contains 20.93% by weight of magnesium, 66.73% by weight of chlorine and 0.53% by weight of silicon.

To another flask of 500 ml, equipped with reflux condenser, mechanical stirrer and thermometer, 146.9 mg of bis(cyclopentadienyl) zirconium dichloride [Zr(C$_5$H$_5$)$_2$Cl$_2$; 0.44 mmol] and 200 ml of anhydrous n-heptane are charged under a nitrogen atmosphere. The solid reactant is dissolved by increasing the temperature of the mixture up to 70° C. To the resulting solution, 12.6 g is added of the solid product obtained as disclosed above, the temperature is kept at 70° C. for 2 hours, the reaction is then cooled down to 40° C. and the liquid phase is removed by siphon. The recovered solid is washed with warm n-heptane, and then with n-hexane at room temperature, and is finally dried by evaporating the solvent under vacuum.

11.5 g of catalyst is obtained as a white solid product with a bulk density of about 0.10 g/ml, containing 21.01% by weight of magnesium, 67.48% by weight of chlorine, 0.35% by weight of silicon and 0.14% by weight of zirconium.

EXAMPLE 2

150 ml of a solution at 20% by weight of butyl octyl magnesium (MgBut$_{1.5}$Oct$_{0.5}$; 21.87 g, 131.3 mmol) in n-heptane, is charged under a nitrogen atmosphere to a flask of 500 ml equipped with reflux condenser, mechanical stirrer and thermometer.

15,4 ml of neat tin tetrachloride (SnCl$_4$; 134.4 mmol) is added dropwise to the solution, during 0.5 hours, at a temperature comprised within the range of from 0° to 20° C. and with stirring. The temperature is increased up to 65° C. and the reaction is allowed to proceed for 1 hour. The reaction is then cooled down to 40° C. and the liquid phase is removed by siphon. The recovered solid matter is thoroughly washed with n-hexane at room temperature and is dried by evaporating the solvent under vacuum. In that way, 12.9 g of a white solid with a bulk density of approximately 0.22 g/ml is obtained, which contains 18.58% by weight of magnesium, 63.75% by weight of chlorine and 2.7% by weight of tin.

To another flask of 500 ml, equipped with reflux condenser, mechanical stirrer and thermometer, 374 mg of bis(cyclopentadienyl) zirconium dichloride [Zr(C$_5$H$_5$)$_2$Cl$_2$; 1.13 mmol] and 350 ml of anhydrous n-heptane are charged under a nitrogen atmosphere. The solid reactant is dissolved by increasing the temperature of the mixture up to 70° C. To the resulting solution, 10 g is added of the solid product obtained as disclosed above, the temperature is kept at 70° C. for 2 hours, the reaction is cooled down to 40° C. and the liquid phase is removed by siphon. The recovered solid is washed with warm n-heptane, and then with n-hexane at room temperature, and is finally dried by evaporating the solvent under vacuum.

9.1 g of catalyst is obtained as a white solid with a bulk density of about 0.17 g/ml, containing 20.28% by weight of magnesium, 65.32% by weight of chlorine, 1.10% by weight of tin and 1.08% by weight of zirconium.

EXAMPLE 3

150 ml of a solution at 20% by weight of butyl octyl magnesium (MgBut$_{1.5}$Oct$_{0.5}$; 21.87 g, 131.3 mmol) in n-heptane, is charged under a nitrogen atmosphere to a flask of 500 ml equipped with reflux condenser, mechanical stirrer and thermometer.

15,4 ml of neat tin tetrachloride (SnCl$_4$; 134.4 mmol) is added dropwise to the solution, during 0.5 hours, at a temperature comprised within the range of from 0° to 20° C. and with stirring. The temperature is increased up to 65° C. and the reaction is allowed to proceed for 1 hour. The reaction is then cooled down to 40° C. and the liquid phase is removed by siphon. The recovered solid matter is thoroughly washed with n-hexane at room temperature and is dried by evaporating the solvent under vacuum. In that way, 13 g of a white solid with a bulk density of approximately 0.22 g/ml is obtained, which contains 18.7% by weight of magnesium, 64.1% by weight of chlorine and 2.5% by weight of tin.

To another flask of 500 ml, equipped with reflux condenser, mechanical stirrer and thermometer, 187 mg of bis(cyclopentadienyl) zirconium dichloride [Zr(C$_5$H$_5$)$_2$Cl$_2$; 0.565 mmol], 214 mg of bis-cyclopentadienyl hafnium dichloride [Hf(C$_5$H$_5$)$_2$Cl$_2$; 0.565 mmol] and 350 ml of anhydrous n-heptane are charged under a nitrogen atmosphere. The solid reactants are dissolved by increasing the temperature of the mixture up to 70° C. To the resulting solution, 10 g are added of the solid product obtained as disclosed above, the temperature is kept at 70° C. for 2 hours, the reaction is cooled down to 40° C. and the liquid phase is removed by siphon. The solid is washed with warm n-heptane, and then with n-hexane at room temperature, and is finally dried by evaporating the solvent under vacuum.

9.5 g of catalyst is obtained as an ivory coloured solid with bulk density of about 0.19 g/ml, containing 21.5% by weight of magnesium, 66.4% by weight of chlorine, 0.91% by weight of tin, 0.51% by weight of zirconium and 1.05% by weight of hafnium.

EXAMPLE 4

To a stainless steel autoclave of Brignole type, equipped with a magnetic anchor stirrer and temperature-controlled by electrical resistors, the following are charged:

| | |
|---|---|
| n-Hexane | 1900 ml |
| Catalyst according to Example 1 | 0.1024 g |
| Co-catalyst (MAO*, solution at 10% by weight in toluene | 5 ml |

| | |
|---|---|
| Molecular weight control agent (H$_2$) | 0.5 bar |
| Ethylene | 14.43 bars |

(*)MAO is "oligomeric methyl aluminoxane".

The polymerization is carried out with an atomic ratio of Al:Zr of 2500, under a total pressure of 15 bars, at a temperature of 70° C. and for a time period of 1.5 hours.

Under these conditions, 87.3 g of polyethylene is obtained with a yield of 0.85 kg of polymer per each gram of catalyst, corresponding to 568 kg of polymer per each gram of zirconium in the catalyst.

The resulting polyethylene displays the following characteristics:

| | |
|---|---|
| Melt-flow Index (ASTM D 1238 E) | 10.6 g/10 minutes |
| Melt-Flow Index (ASTM D 1238 F) | 270.9 g/10 minutes |
| Shear Sensitivity | 26.3 |

EXAMPLE 5

Ethylene is polymerized as in above Example 4, by using 0.018 g of catalyst of Example 2, 6.4 ml of co-catalyst (MAO solution at 10% by weight in toluene), and with an atomic ratio of Al:Zr of 5000.

Under these conditions, 197.8 g of polyethylene is obtained with a yield of 11.1 kg of polymer per each gram of catalyst, corresponding to 1040 kg of polymer per each gram of zirconium in the catalyst.

The resulting polyethylene displays a Melt-flow Index (ASTM D 1238 E) of 22.7 g/10 minutes.

EXAMPLE 6

Ethylene is polymerized in a similar way to above Example 4, by using 0.022 g of the catalyst of Example 2, 3.8 ml of co-catalyst (MAO solution at 10% by weight in toluene), and with an atomic ratio of Al:Zr of 2500.

Under these conditions, 172 g of polyethylene is obtained with a yield of 7.9 kg of polymer per each gram of catalyst, corresponding to 730 kg of polymer per each gram of zirconium in the catalyst.

EXAMPLE 7

Ethylene is polymerized as in Example 4, with the following changes:

| | |
|---|---|
| Catalyst of Example 2 | 0.0182 g |
| Co-catalyst (MAO solution at 10% by weight in toluene) | 6.4 ml |
| An atomic ratio of Al:Zr of | 5000 |
| Polymerization time | 3 hours |

Under these conditions, 248 g of polyethylene is obtained with a yield of 13.6 kg of polymer per each catalyst gram, corresponding to 1280 kg of polymer per each zirconium gram in the catalyst.

EXAMPLE 8

Ethylene is polymerized as in Example 4, in the absence of hydrogen as a molecular weight control agent and with the following further changes:

| | |
|---|---|
| Catalyst of Example 2 | 0.0015 g |
| Co-catalyst (MAO solution at 10% by weight in toluene) | 2.6 ml |
| An atomic ratio of Al:Zr of | 2500 |
| Polymerization temperature | 120° C. |
| Polymerization time | 0.5 hours |

Under these conditions, 30 g of polyethylene is obtained with a yield of 2 kg of polymer per each catalyst gram, corresponding to 105 kg of polymer per each zirconium gram in the catalyst.

The resulting polyethylene displays a Melt-flow Index (ASTM D 1238 E) of 35 g/10 minutes.

EXAMPLE 9

Ethylene is polymerized as in Example 4, with the following other changes:

| | |
|---|---|
| Catalyst of Example 3 | 0.167 g |
| Co-catalyst (MAO solution at 10% by weight in toluene) | 5.7 ml |
| An atomic ratio of Al:(Zr + Hf) of | 5000 |

Under these conditions, 180 of polyethylene is obtained with a yield of 10.8 kg of polymer per each catalyst gram, corresponding to 678 kg of polymer per each gram of zirconium plus hafnium in the catalyst.

The resulting polyethylene displays a melt-flow index (ASTM D 1238 E) of 0.35 g/10 minutes, a Melt-flow index (ASTM D 1238 F) of 24,75 g/10 minutes and a shear sensitivity of 45.

What is claimed is:

1. Process for preparing a catalyst containing a cyclopentadienylic derivative of a metal from the Group IVB of the Periodic Table of Elements, supported on a solid carrier and containing from 0.05 to 5% by weight of tin consisting of the steps:

(i) a dialkyl magnesium, or an alkyl magnesium halide, and a tin chloride are dissolved in an inert organic solvent with the atomic ratio of tin to magnesium within the range of from 0.5:1 to 10:1, and are kept in contact at a temperature from 30° C. to 70° C. until a granular solid precipitates;

(ii) said granular solid is suspended in an inert organic solvent and is brought into contact with a compound which is defined by the formula:

(I)

wherein:

M means a metal from Group IVB of the Periodic Table of Elements; each R independently is selected from the group consisting of a halogen atom, an either linear or branched alkyl group containing from 1 to 10 carbon atoms and an aryl group; and each C$_p$ is independently selected from the group consisting of a cyclopentadienyl, indenyl or fluorenyl group, possibly bearing one or more $C_1$–$C_4$ alkyl substituents, and said groups $C_p$ may be furthermore linked to each other by means of a linking bridge structure of carbon atoms or an alkyl silylenic structure, wherein the atomic ratio of magnesium, from step (i), to said metal of Group IVB in said compound (I), is within the range of from 5:1 to 5000:1, wherein the temperature is within the range of from 0° to 100° C. and during a time of at least 0.5 hours, in order to form a suspension of a granular solid catalyst; and (iii) said solid catalyst is recovered from the resulting suspension.

2. Process according to claim 1, wherein said dialkyl magnesium is represented by the formula MgR'R'' wherein each R' and R'', which may be the same, or different from each other, independently means a linear or branched alkyl group of from 1 to 10 carbon atoms.

3. Process according to claim 2, wherein said dialkyl magnesium is selected from the group consisting of diethyl magnesium, ethyl butyl magnesium, dihexyl magnesium, butyl octyl magnesium and dioctyl magnesium.

4. Process according to claim 1, wherein said tin chloride is tin tetrachloride.

5. Process according to claim 1, wherein in said formula (I), said metal M is selected from titanium, zirconium and hafnium, each R is a chlorine atom or an alkyl group of from 1 to 8 carbon atoms, and each $C_p$ is selected from cyclopentadienyl, indenyl and fluorenyl groups, which may either be non-substituted or bear one or more $C_1$–$C_4$ alkyl substituents, and both groups $C_p$ may be linked by an either linear or branched alkylene linking bridge of from 1 to 4 carbon atoms, or by a dialkyl silyl moiety.

6. The process of claim 5 wherein M is zirconium or hafnium.

7. Process according to claim 5, wherein said compound (I) is selected from the group consisting of bis (cyclopentadienyl) zirconium dichloride, bis (cyclopentadienyl) hafnium dichloride, bis (cyclopentadienyl) zirconium octyl chloride, bis (cyclopentadienyl) zirconium dimethyl, ethylene bis (indenyl) zirconium dichloride, ethylene bis(indenyl) hafnium dichloride and isopropyl (cyclopentadienyl fluorenyl) hafnium dichloride.

8. Process according to claim 1, wherein step (i) is carried out in solution in an aliphatic hydrocarbon solvent with an atomic ratio of tin to magnesium within the range of from 0.5:1 to 10:1, at a temperature within the range of from 30° C. to 70° C. and for a time of from 0.5 to 5 hours.

9. The process of claim 8 wherein the temperature in step (i) is 60–70° C.

10. The process of claim 8 wherein the time in step (i) is about one hour.

11. Process according to claim 1, wherein step (ii) is carried out in an aliphatic hydrocarbon solvent with a ratio of magnesium to said Group IVB metal within the range of from 5:1 to 5000:1, at a temperature within the range of from 20 to 90° C. and during a time period of from 0.5 to 5 hours.

12. The process of claim 11 wherein the time in step (ii) is from 1 to 2.5 hours.

13. Catalytic system for the polymerization of olefins, consisting of the catalyst obtained according to claim 1, and an aluminoxane co-catalyst, with an atomic ratio of aluminum in said co-catalyst to the Group IVB metal in the solid catalyst within the range of from 10:1 to $10^8$:1.

14. The catalytic system of claim 13 wherein said atomic ratio is $10^2$:1 to $10^4$:1.

* * * * *